US006465097B1

(12) United States Patent
Ueoka et al.

(10) Patent No.: US 6,465,097 B1
(45) Date of Patent: Oct. 15, 2002

(54) INSULATED WIRE

(75) Inventors: Isao Ueoka, Osaka; Masaharu Kurata; Hideyuki Hashimoto, both of Nagoya, all of (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/447,798

(22) Filed: Nov. 23, 1999

(30) Foreign Application Priority Data

Nov. 24, 1998 (JP) .......................................... 10-332257
Oct. 8, 1999 (JP) .......................................... 11-287460

(51) Int. Cl.[7] .......................... D02G 3/36; B32B 15/02; H01B 7/00; H01B 3/30

(52) U.S. Cl. ................. 428/383; 428/379; 174/110 FC; 174/120 SR

(58) Field of Search ................................ 428/379, 383; 174/110 FC, 120 SR

(56) References Cited

U.S. PATENT DOCUMENTS 3,684,755 A * 8/1972 Gumerman ............... 260/17 R
3,754,909 A * 8/1973 Feltzin et al. ................. 91/1.5
3,839,174 A * 10/1974 Masuda et al. ............. 204/181
4,070,341 A * 1/1978 Schulz .................... 260/45.95
5,750,221 A * 5/1998 Scheckbach et al. ....... 428/35.7
5,864,095 A * 1/1999 Scheckenbach et al. 174/120 R
5,902,681 A * 5/1999 Ueoka et al. ............... 428/383
5,985,460 A * 11/1999 Wang et al. ................ 428/426
2001/0016625 A1 * 8/2001 Lahijani ..................... 525/151

FOREIGN PATENT DOCUMENTS

JP 61-156114 9/1986
JP 63-29412 2/1988
JP 6-122841 A * 5/1994

OTHER PUBLICATIONS

Derwent Abstract Acc–No 1994–352168, 1994.*
Derwent Abstract Acc–No 1989–350940, 1989.*
Derwent Abstract Acc–No 1980–54267C, 1994.*

* cited by examiner

*Primary Examiner*—Cynthia H. Kelly
*Assistant Examiner*—J. M. Gray
(74) *Attorney, Agent, or Firm*—Smith, Gambrell & Russell, LLP

(57) ABSTRACT

A new insulated wire resists heat cycles under severe operating ambient temperatures without reducing the lifetime of coils in which the insulated wire is used. The insulated wire has on the insulating coating a fluororesin coating without or with a binder constituting 20 wt. % or less. The fluororesin coating comprises fluororesin such as polytetrafluoroethylene, a tetrafluoroethylene-perfluoroalkylvinylether copolymer, or a fluoroethylene-propylene copolymer.

3 Claims, No Drawings

INSULATED WIRE

BACKGROUND OF THE INVENTION

1. Field of the Invention

The present invention relates to an insulated wire used for a coil to be molded with resin after being coiled, for instance.

2. Description of the Background Art

Electrical equipment of automobiles, electronic devices, and other devices that use insulated wires have been required in recent years to be smaller, lighter, and higher in performance in order to enhance energy saving and space saving. To meet the requirements, coils used for the above-mentioned equipment and devices have become high in density of the winding of insulated wires and high in operating current density. Because these devices have been used at higher ambient temperatures, coiled insulated wires have been used inevitably at higher ambient temperatures. Because high winding density has been achieved by squeezing the insulated wire into the enclosure of electronic or other devices, the possibility of damaging the insulating coating of the wire during the winding process has increased. Under such circumstances, the following problems have occurred in flyback transformers used for the CRT of TVs and personal computers and in resin-molded coils such as ignition coils for automobiles:

(a) Damage in insulating coating causes failure in insulation between the conductors or between the conductor and the ground, resulting in unsatisfactory electrical characteristics of the device, and (b) Higher operating ambient temperature decreases the lifetime of the coil. A study on the cause of the lifetime reduction in resin-molded coils revealed that coils are subjected to heat cycles between room temperature and operating ambient temperature, and their lifetime is reduced by the action of strain caused by the heat cycles.

Lead wires for motor coils whose conductor is covered with a rubber/plastic insulating material have had another problem; when the coils are impregnated with varnish, if the varnish adheres to a lead wire, the lead wire becomes stiff so that bending of the wire produces cracks not only in the varnish but also in the insulating layer at the same time. Techniques have been developed to prevent this problem by forming a coating on the insulating layer with a material having good releasing quality such as fluororesin, silicone, lubricant, and polyethylene glycol (see Published Japanese Utility Model Application Jitsukaishou 61-156114, for example).

The present inventors extracted an idea from these techniques and studied lifetime prolongation of resin-molded coils by forming releasing layers made of various materials on the surface of insulated wires. However, some were insufficient in releasing quality and some were mechanically weak as a releasing layer so that parts of the releasing layer fell off in the winding process, producing unstable quality of adhesion with the molded resin in the longitudinal direction of the insulated wire. No releasing layer tested succeeded in prolonging the lifetime of the coil as a result.

However, we found during the process of the study that (a) when releasing layers formed on the insulated wires were uneven or when silicone or lubricant was used as a part of the layer, prolongation of the lifetime of resin-molded coils was difficult to achieve and that (b) fluororesin is a comparatively suitable material for releasing purposes.

According to the above-cited invention, various kinds of releasing agents may be used as described above, and a releasing layer usually has a thickness in the range as wide as 0.00001 mm or more, desirably from 0.0001 to 0.1 mm. The reason why releasing agents and the thickness of releasing layers have such a high degree of freedom is attributed to the fact that instances of concurrent cracking of the varnish and insulating coating are relatively limited. More specifically, because thin pieces of impregnating varnish adhere at limited portions to the comparatively thick rubber/plastic coating of insulated wires, the concurrent cracking occurs only when the insulated wire is subjected to a large magnitude of distortion or to abrupt deformation.

With resin-molded coils, on the other hand, because the molded resin is thicker than the insulating coating and covers the entire surface of the coil, even a small amount of distortion resulting from heat cycles or another cause may increase the stress transferred from the molded resin to the insulating coating, producing defective conditions.

SUMMARY OF THE INVENTION

An object of the present invention is to offer a new insulated wire that prevents the reduction in lifetime of resin-molded coils under severe operating conditions such as heat cycles with large temperature differences. To achieve this object, the present inventors have earnestly studied the constitution of insulated wires. Finally, the inventors found that the means described below can prolong the lifetime of coils even when coils formed under severe coiling conditions are subjected to heat cycles with large temperature differences, thereby completing the present invention.

The present invention offers an insulated wire that has, on the insulating coating mainly consisting of thermosetting resin, (a) a coating comprising fluororesin without containing a binder or (b) a coating comprising fluororesin and a binder in which the binder constitutes 20 wt. % or less of the total amount of the fluororesin and binder.

The constitution of the present invention was found through the process described below.

(1) First, a study was made on the cause of the lifetime reduction of coils. Coils are covered entirely with molded resin, and the coils' insulated wire is strongly bonded to the molded resin. When the entire molded resin is subjected to heat cycles, the molded resin and coils expand and contract repeatedly. The molded resin is filled with inorganic fillers such as silica for the molded resin to have a thermal expansion coefficient as close as possible to that of the conductor, copper, for instance, of the insulated wire. However, the thermal expansion coefficient of the molded resin is not the same as that of the insulated wire. Therefore, when the temperature difference in heat cycles increases, a difference appears in the magnitude of expansion and contraction between the two components. This discrepancy produces strains between the molded resin and the insulated wire of the coils. When the heat cycles are repeated, the strains accumulate and produce cracks in the relatively weak coating of the insulated wire. The cracks finally lead to an interlayer shortcircuit of the insulated wire of the coils.

(2) In view of the above failure mechanism, the present inventors first considered that the reduction in the bonding strength between the molded resin and the insulated wire of coils is effective to prevent the reduction in the lifetime of coils. In seeking a method for reducing the bonding strength, the concept of providing a releasing layer on the insulated wire transpired. A fluororesin paint was examined as a material constituting the releasing layer. Fluororesin included in fluororesin paint is less adhesive than other ordinary resins and rarely adheres to other substances. It was expected that when fluororesin was added to the insulating coating of insulated wires or when a coating of fluororesin paint was formed on the insulating coating, coils produced with these wires would have reduced bonding strength between the molded resin and coils. Contrary to the expectation, however, the results of the experiments show that the addition of fluororesin into the coating of insulated wires and the application and baking of an ordinary fluororesin paint failed to sufficiently reduce the bonding strength between the molded resin and insulated wire. In other words, the bonding-strength reduction was insufficient to prevent the lifetime reduction of coils.

(3) After various studies, the present inventors found that a binder usually included in a fluororesin paint impedes the reduction of the bonding strength between the molded resin and insulated wire. It is considered that when a fluororesin paint is applied and baked, the binder usually binds fluororesin particles together to assist the formation of a strong coating. When a fluororesin paint high in the binder percentage is applied and baked, the binder not only exercises the foregoing function but also increases the adhesion of the fluororesin coating, causing the releasing quality from the molded resin to be insufficient.

(4) After further studies on the subject matter, the present inventors found that when a coating comprising fluororesin without containing a binder or a coating comprising fluororesin and a binder in which the binder constitutes 20 wt. % or less of the total amount of the fluororesin and binder is formed on an insulating coating mainly consisting of thermosetting resin, the bonding strength between the molded resin and the insulated wire of coils decreases considerably, thereby prolonging the lifetime of the coils. This is attributed to the non-adhesion of fluororesin and the low strength of the coating; when heat cycles induce strains, the formed fluororesin coating fractures and miti- gates strains induced in the insulating layer.

When fluororesin is added into the insulating coating of insulated wires, the insulating material in the insulating coating plays the same role as the foregoing binder. Because the specified insulating performance requires a high percentage of the insulating material, this means of adding fluororesin into the insulating coating of insulated wires cannot produce a sufficient effect of reduction in the bonding strength between the molded resin and insulated wire.

(5) If the formed releasing coating is excessively low in strength, when an insulated wire is wound to form a coil, the coating is likely to flake off and produce unwanted particles for the following resin molding process. These particles sometimes deteriorates the performance of the coil: they shorten the lifetime of the coil, for instance. Therefore, taking the coil winding process into consideration, it is desirable to form on the insulating coating a coating comprising fluororesin and a binder in which the binder constitutes 1 to 20 wt. % of the total amount of the fluororesin and binder rather than a coating comprising fluororesin without containing a binder. It is more desirable to form on the insulating coating a coating in which the binder constitutes 2 to 15 wt. % of the total amount of the fluororesin and binder. It is yet more desirable to form on the insulating coating a coating in which the binder constitutes 3 to 10 wt. % of the total amount of the fluororesin and binder.

The insulated wire of the present invention, conceived through the above described process, produces coils that hardly adhere to the molded resin, thereby prolonging the lifetime of the molded coils. Such molded coils are capable of enduring severe operating conditions such as heat cycles with large temperature differences, and hence meet the requirements of miniaturization and weight reduction in electrical equipment of automobiles and electronic devices. Their industrial value can be said to be enormous.

DETAILED DESCRIPTION OF THE INVENTION

The insulated wire of the present invention is produced by the following process:

(a) an insulating paint mainly consisting of thermosetting resin is applied to the conductor and baked to form an insulating coating, and (b1) a fluororesin paint comprising fluororesin without containing a binder is applied to the insulating coating and baked to form a coating, or (b2) a fluororesin paint comprising fluororesin and a binder is applied to the insulating coating and baked to form a coating.

The application and baking of an insulating paint and a fluororesin paint enable the formation of an even coating. When coils formed by the insulated wire are subjected to heat cycles in actual use, the evenness of the coating reduces the transfer of the strains the molded resin to the insulated wire of the coils, thus reducing the possibility of malfunction.

The insulating coating for the insulated wire of the present invention may be composed of any ordinary thermosetting resin such as polyvinyl formal, polyurethane, polyester urethane, polyester, polyester imide, polyhydantoine, polyamide imide, polyimide, polybenzimidazole, polybenzoxazole, polyester amide imide, polyester imide urethane, polyamide, aromatic polyamide, epoxy resin, and silicone resin or a resin composite of these. Of these, the following thermosetting resins and their composites are desirable because they are able to resist the severe winding process: polyvinyl formal, polyurethane, polyester urethane, polyester, polyester imide, polyhydantoine, polyamide imide, polyimide, polybenzimidazole, polybenzoxazole, polyester amide imide, and polyester imide urethane.

It is possible to use a multilayer coating having a combined structure of some of the foregoing coatings. It is also possible to use mixtures of the paints. If necessary, an insulating paint may contain fillers, adhesion imparting agents, antioxidants, lubricants, pigments, dye, etc.

The insulated wire of the present invention may have an insulating coating with an ordinary thickness of 0.001 to 0.1 mm.

According to the present invention, a coating formed on the insulating coating may comprise either (a) fluororesin without containing a binder or (b) a mixture of fluororesin and a binder in which the binder constitutes 20 wt. % or less of the total amount of the fluororesin and binder. The following fluororesins may be used singly or in combination for the coating:

polytetrafluoroethylene (hereinafter called PTFE), tetrafluoroethylene-perfluoroalkylvinylether copolymer (hereinafter called PFA), fluoroethylene-propylene copolymer (hereinafter called FEP), ethylene-tetrafluoroethylene copolymer (hereinafter called ETFE), polyvinylidene fluoride (hereinafter called PVdF), polychlorotrifluoroethylene (hereinafter called PCTFE), etc.

Of these, PTFE, PFA, and FEP are desirable because they are free from a molecular C-H structure and are high in non-adhesion effect.

According to the present invention, the binder included in a fluororesin coating formed on the insulating coating has no special limitations; any material used as an ordinary binder may be used. The following materials are usually used as the binder: (a) thermosetting resins such as thermosetting polyester, polyurethane, epoxy resin, phenol resin, melamine resin, unsaturated polyester resin, polyester imide, polyhydantoine, aromatic polyamide, polyamide imide, polyimide, bismaleimide resin, BT resin, and cyanate ester resin or resin composites of these, and (b) thermoplastic resins such as polyester, polyamide, polycarbonate, polysulfone, polyphenylene sulfide, polyether sulfone, polyether imide, thermoplastic polyimide, and polyether ether ketone or resin composites of these. The foregoing resins and resin composites may contain organic fillers, pigments, dyes, etc.

Of these resins and resin composites, the following resins and the resin composites comprising the following resins are desirable because they form a coating easily and have high heat resistance: polyamide imide, polyimide, polyester imide, thermosetting polyester, polyurethane, polyhydantoine, polyether sulfone, polysulfone, and polyether imide.

According to the present invention, the fluororesin paint may be prepared by dissolving or dispersing the foregoing fluororesin or the foregoing mixture of fluororesin and binder into a solvent- such as water, alcohol such as ethyl alcohol and butyl alcohol, ketone such as methyl ethyl ketone and cyclohexanone, ester such as ethyl acetate and butyl acetate, aromatic naphtha such as toluene and xylene, N-methyl-2-pyrrolidone (hereinafter called NM2P), and cresol.

Of these, the following paints are desirable because they are high in non-adhesion effect: the paints that dissolve or disperse PTFE, PFA, or FEP singly or combined with a binder into water, alcohol, NM2P, or cresol. Of these, the following paints are yet more desirable because they easily form an even coating by the application to an insulating coating and baking: the paints that dissolve or disperse PTFE, PFA, or FEP singly or combined with a binder into NM2P or cresol.

It is desirable that a paint dispersing the foregoing fluororesin and a binder into NM2P or cresol be baked on an insulating coating made of such resin as thermosetting polyester, polyurethane, polyester imide, polyamide imide, or polyimide because the fluororesin paint is wettable to the insulating coating. This wettability enables the fluororesin and binder to adhere to the insulating coating of insulated wires, reducing the possibility of the falling off of the fluororesin at the time the insulated wires are wound into coils.

The foregoing fluororesin paint may contain other resins, fillers, antioxidants, lubricants, pigments, dyes, etc. to the extent that the performance under heat cycles is not adversely affected.

Ordinary fluororesin paints typically contain 20 to 30 wt. % binder in order to increase the strength of the coating. The present invention, however, specifies the use of (a) a fluororesin paint free from a binder or (b) a paint having a binder constituting 20 wt. % or less of the total amount of the fluororesin and binder; i.e., the fluororesin constitutes 80 wt. % or more. This is because that when a fluororesin paint having a binder content of more than 20 wt. % is used, due to the strong coating of the fluororesin and high adhesion between the molded resin and fluororesin, the releasing property between the molded resin and insulated wire becomes insufficient, which is contrary to the object of the present invention.

According to the present invention, a fluororesin paint free from a binder is effective. However, it is more desirable to use a binder-containing fluororesin paint in which the binder constitutes 1 to 20 wt. % of the total amount of the fluororesin and binder. If the binder content is less than 1 wt. %, the fluororesin in the releasing layer may fall off at the time the insulated wire is wound into coils.

In order for the fluororesin in the releasing layer to remain without falling off and to resist deformation under heat cycles, it is yet more desirable that the binder constitute 2 to 15 wt. % of the total amount of the fluororesin and binder, preferably in the range of 3 to 10 wt. %.

According to the present invention, it is desirable that a coating have a thickness not less than 0.0005 mm and not more than 0.005 mm, the coating comprising (a) fluororesin without containing a binder, or (b) fluororesin and a binder in which the binder constitutes 20 wt. % or less of the total amount of the fluororesin and binder. If less than 0.0005 mm, lifetime prolongation of the coil is minimal; if more than 0.005 mm, the fluororesin falls off during the coiling, causing the coiling to be difficult.

According to the present invention, ordinary methods for forming the coating of insulated wires may be applied to (a) the forming of an insulating coating by applying an insulating paint to the conductor and baking it and to (b) the forming of a coating of fluororesin or a coating comprising fluororesin and a binder by applying a fluororesin paint with or without a binder and baking it.

According to the present invention, the conductor of insulated wires may be made of any ordinary material such as copper, a copper alloy, aluminum, silver, or gold, and the conductor may be plated with a different type of metal.

PREFERRED EMBODIMENTS OF THE INVENTION

An explanation of the preferred embodiments of the present invention is given below by showing Examples and Comparative Examples. The characteristics of insulated wires were measured and evaluated by the following methods:

(1) Flexibility:

The test was carried out in accordance with Japanese Industrial Standard JIS C 3003 "Test methods of enameled copper wires and enameled aluminum wires."

(2) Unidirectional Abrasion:

The test was carried out in accordance with JIS C 3003.

(3) Resin Bonding Strength:

About 4 ml of epoxy resin was poured into an approximately-5-ml cup. A length of insulated wire produced in Examples or Comparative Examples described below was vertically inserted into the epoxy resin at the center. The assembly was heated in a thermostatic oven at 150 ° C. for about 3 hours to harden the epoxy resin. After the sample was cooled down, the insulated wire was extracted from the resin to measure the resin bonding strength. The measurement was carried out at room temperature by a tensile tester at a pulling speed of 50 mm/min. The buried length of the insulated wire in the resin was about 20 mm.

In order to prevent damage to the insulating coating under heat cycles, it is essential that the resin bonding strength be not more than 3 kg, desirably not more than 2 kg.

COMPARATIVE EXAMPLE 1

A polyester imide varnish (Nisshoku Schenectudy Co.-made, Brand name: Isomid 40SH) was applied to a copper wire 0.6 mm in diameter and baked in an oven at 300 to 400° C. to produce an insulated wire having a coating thickness of 0.025 mm. The characteristics of the obtained insulated wire were measured by the above-described methods, and the results are shown in Table 1.

COMPARATIVE EXAMPLE 2

The same polyester imide varnish as in Comparative Example 1 was applied to a copper wire 0.6 mm in diameter and baked in an oven at 300 to 400° C. Onto this coating, another polyamide imide varnish (Hitachi Chemical Co.-made, Brand name: HI-406) was applied and baked under the same condition as above to produce an insulated wire having a coating thickness of 0.025 mm. The polyester imide coating has a thickness of 0.018 mm, and the polyamide imide coating of 0.007 mm. The characteristics of the obtained insulated wire were measured by the same methods as those for Comparative Example 1, and the results are also shown in Table 1.

TABLE 1

| | Comparative Example 1 | Comparative Example 2 |
|---|---|---|
| Material of insulating coating | EI (*1) | EI/AI (*2) |
| Fluororesin coating | Not applied | Not applied |
| Conductor diameter (mm) | 0.601 | 0.601 |
| Insulating coating thickness (mm) | 0.025 | 0.025 |
| Overall diameter (mm) | 0.651 | 0.651 |
| Flexibility | Good | Good |
| Unidirectional abrasion (g) | 620 | 710 |
| Resin bonding strength (kg) | 7.5 | 8.5 |

(*1): polyester imide
(*2): undercoating: polyester imide, upper coating: polyamide imide

TABLE 2

| | Example 1 | Example 2 | Example 3 | Example 4 | Example 5 |
|---|---|---|---|---|---|
| Material of insulating coating | EI/AI | EI | EI | EI | EI |
| Material of fluororesin coating | PTFE | PTFE | PFA | FEP | PTFE |
| (without binder) | KD-1000AS(*3) | D-1(*4) | AD-2CR(*5) | ND-1(*6) | KD-200AS(*7) |
| Conductor diameter (mm) | 0.601 | 0.601 | 0.601 | 0.601 | 0.601 |
| Insulating coating thickness (mm) | 0.025 | 0.025 | 0.025 | 0.025 | 0.025 |
| Fluororesin coating thickness (mm) | 0.001 | 0.001 | 0.001 | 0.001 | 0.001 |
| Overall diameter (mm) | 0.653 | 0.653 | 0.653 | 0.653 | 0.653 |
| Flexibility | Good | Good | Good | Good | Good |
| Unidirectional abrasion (g) | 780 | 710 | 680 | 670 | 730 |
| Resin bonding strength (kg) | 1 | 1.5 | 1.8 | 1.9 | 1 |

(*3)brand name of Kitamura Co. - made PTFE paint
(*4)brand name of Daikin Kogyo Co. - made PTFE paint
(*5)brand name of Daikin Kogyo Co. - made PFA paint
(*6)brand name of Daikin Kogyo Co. - made FEP paint
(*7)brand name of Kitamura Co. - made PTFE paint

EXAMPLE 1

A fluororesin paint (Kitamura Co.-made, Brand name: KD-1000AS) that comprises PTFE dispersed in NM2P was applied onto the insulated wire obtained in Comparative Example 2, and baked in an oven at 300 to 400° C. to form a fluororesin-containing coating 0.001 mm in thickness. The obtained insulated wire was evaluated by the same methods as those for Comparative Example 1, and the results are shown in Table 2.

EXAMPLES 2 TO 5

The different fluororesin paints were respectively applied onto the base insulated wire obtained in Comparative Example 1 for completing insulated wires in a similar method as in Example 1 except that the fluororesin paint was not used as follows:

Example 2: a PTFE paint (Daikin Kogyo Co.-made, Brand name: D-1),

Example 3: a PFA paint (Daikin Kogyo Co.-made, Brand name: AD-2CR),

Example 4: an FEP paint (Daikin Kogyo Co.-made, Brand name: ND-1), and

Example 5: a PTFE paint (Kitamura Co.-made, Brand name: KD-200AS).

The characteristics of the obtained insulated wires are also shown in Table 2.

EXAMPLES 6 TO 10

The thickness of fluororesin-containing coatings was changed by altering the inside diameter of the die for applying fluororesin paints. With other conditions remaining the same as in Example 1, the following insulated wires were produced:

Example 6: thickness of coating: 0.0002 mm,

Example 7: thickness of coating: 0.0005 mm,

Example 8: thickness of coating: 0.002 mm,

Example 9: thickness of coating: 0.004 mm, and

Example 10: thickness of coating: 0.007 mm.

The characteristics of the obtained insulated wires are shown in Table 3.

EXAMPLES 11 TO 14 AND COMPARATIVE EXAMPLES 3 TO 4

A polyamide imide paint (Hitachi Chemical Co.-made, Brand name: HI-406) was added as a binder to a binder-free fluororesin paint (Kitamura Co.-made, Brand name: KD-1000AS) to provide a paint comprising fluororesin and a binder. Thus, various insulated wires were produced with the same as in Example 1 except that different paint and binder contents as shown in Tables 4 and 5.

The characteristics of the obtained insulated wires are also shown in Tables 4 and 5.

TABLE 3

| | Example 6 | Example 7 | Example 8 | Example 9 | Example 10 |
|---|---|---|---|---|---|
| Material of insulating coating | EI/M | EI/AI | EI/AI | EI/AI | EI/AI |
| Material of fluororesin coating(without binder) | PTFE KD-1000AS | PTFE KD-1000AS | PTFE KD-1000AS | PTFE KD-1000AS | PTFE KD-1000AS |
| Conductor diameter (mm) | 0.601 | 0.601 | 0.601 | 0.601 | 0.601 |
| Insulating coating thickness (mm) | 0.025 | 0.025 | 0.025 | 0.025 | 0.025 |
| Fluororesin coating thickness (mm) | 0.0002 | 0.0005 | 0.002 | 0.004 | 0.007 |
| Overall diameter (mm) | 0.651 | 0.652 | 0.655 | 0.659 | 0.665 |
| Flexibility | Good | Good | Good | Good | Good |
| Unidirectional abrasion (g) | 730 | 760 | 800 | 830 | 820 |
| Resin bonding strength (kg) | 2.5 | 1.5 | 0.5 | 0.5 | 0.5 |

TABLE 4

| | Example 11 | Example 12 | Example 13 | Example 14 |
|---|---|---|---|---|
| Material of insulating coating | EI/AI | EI/AI | EI/AI | EI/AI |
| Material of Fluororesin coating | | | | |
| PTFE KD-1000AS (wt. %) | 99 | 97 | 90 | 80 |
| binder HI-406 (*8) (wt. %) | 1 | 3 | 10 | 20 |
| Conductor diameter (mm) | 0.601 | 0.601 | 0.601 | 0.601 |
| Insulating coating thickness (mm) | 0.025 | 0.025 | 0.025 | 0.025 |
| Fluororesin coating thickness (mm) | 0.001 | 0.001 | 0.001 | 0.001 |
| Overall diameter (mm) | 0.653 | 0.653 | 0.653 | 0.653 |
| Flexibility | Good | Good | Good | Good |
| Unidirectional abrasion (g) | 770 | 800 | 820 | 830 |
| Resin bonding strength (kg) | 1.2 | 1.1 | 1.5 | 2.2 |

(*8): brand name of Hitachi Chemical Co.-made polyamide imide paint

TABLE 5

| | Comparative Example 3 | Comparative Example 4 |
|---|---|---|
| Material of insulating coating | EI/AI | EI/AI |
| Material of fluororesin coating | | |
| PTFE KD-1000AS (wt. %) | 70 | 50 |
| binder HI-406 (wt. %) | 30 | 50 |
| Conductor diameter (mm) | 0.601 | 0.601 |
| Insulating coating thickness (mm) | 0.025 | 0.025 |
| Fluororesin coating thickness (mm) | 0.001 | 0.001 |
| Overall diameter (mm) | 0.653 | 0.653 |
| Flexibility | Good | Good |
| Unidirectional abrasion (g) | 820 | 830 |
| Resin bonding strength (g) | 4.8 | 5.1 |

EXAMINATIONS OF EXAMPLES AND COMPARATIVE EXAMPLES

A comparison of Examples 1 to 5 with Comparative Examples 1 and 2 reveals the following: When a layer of binder-free fluororesin such as PTFE, PFA, or FEP is formed on an insulating coating as in Examples 1 to 5, the bonding strength between the molded resin and the insulated wire can be reduced significantly, without deteriorating other properties, in comparison with the insulated wires having no fluororesin layer as in Comparative Examples 1 and 2.

A comparison of Examples 11 to 14 with Comparative Examples 3 and 4 reveals the following: When the content of a binder added to the fluororesin is 20 wt. % or less as in Examples 11 to 14, the bonding strength between the molded resin and the insulated wire can be reduced significantly. However, when the content of a binder added to the fluororesin is in excess of 20 wt. % as in Comparative Examples 3 and 4, the bonding strength between the molded resin and the insulated wire cannot be reduced sufficiently.

Therefore, it is essential that a binder content be 20 wt. % or less, in order to reduce the bonding strength between the molded resin and the insulated wire, thereby preventing the reduction of lifetime of coils.

Next is a mutual comparison between Examples. In order to consider the coiling process, the presence or absence of the falling off of the coating was additionally examined by the following method:

Examination of the presence or absence of the falling off of the coating:

In accordance with the pencil hardness test stipulated in JIS C 3003, the surface of the insulated wires was scratched by a 2H pencil to examine whether the coating falls off or not.

The results of the examination were as follows:

Example 10: falling off was significant,

Examples 1 to 9: falling off was limited,

Example 11: almost no falling off was observed,

Examples 12 to 14: no falling off was observed. Consequently, considering the coiling process, it is essential that the binder content be 1 wt. % or more, desirably 2 wt. % or more, more desirably 3 wt. % or more.

Taking into consideration all the obtained results, it is desirable that the binder content be in the range of 1 to 20 wt. %, more desirably in the range of 2 to 15 wt. %, and preferably in the range of 3 to 10 wt. %.

Next is an examination of the thickness of a fluororesin coating.

As can be seen in Table 3, Example 6 with a fluororesin-coating thickness of 0.0002 mm still has a bonding strength of 2.5 kg between the molded resin and the insulated wire. On the other hand, Example 10 with a fluororesin coating thickness of 0.007 mm showed a significant falling off of the coating as described above. Therefore, it is desirable that a fluororesin coating have a thickness in the range of 0.0005 to 0.005 mm.

In addition, although not shown in Examples above, the insulated wire of the present invention is equal to or better than ordinary insulated wires in electrical properties, resistance to heat, and mechanical properties, proving its practical applicability.

What is claimed is:

1. An insulated wire comprising:

(a) an insulated coating mainly consisting of thermosetting resin; and (b) a coating comprising fluorosesin and a binder, wherein the binder constitutes 1 to 20 wt. % of the total amount of the fluororesin and the binder, formed on the insulating coating, wherein the binder is a thermosetting resin, wherein the thermosetting resin is selected from the group consisting of a polyester, a polyurethane, an epoxy resin, a phenol resin, a melamine resin, an unsaturated polyester resin, a polyester imide, a polyhydantoine, an aromatic polyamide, a polyamide imide, a polyimide, a bismaleimide resin, a BT resin, a cyanate ester resin and combinations thereof.

2. An insulated wire comprising:

(a) an insulated coating mainly consisting of thermosetting resin; and (b) a coating comprising fluorosesin and a binder, wherein the binder constitutes 1 to 20 wt. % of the total amount of the fluororesin and the binder, formed on the insulating coating, wherein the binder is a thermoplastic resin, wherein the thermoplastic resin is selected from the group consisting of a polyester, a polyamide, a polycarbonate, a polysulfone, a polyphenylene sulfide, a polyether sulfone, a polyether imide, a thermoplastic polyimide, a polyether ether ketone, and combinations thereof.

3. An insulated wire comprising:

(a) an insulating coating mainly consisting of thermosetting resin; and (b) a coating, comprising a fluororesin and a binder, wherein the binder is at least one resin selected from the group consisting of polyamide imide, a polyimide, polyester imide, thermosetting polyester, polyurethane, polyhydantoine, polyether sulfone, polysulfone, and polyether imide, and wherein the binder constitutes 1 to 20 wt. % of the total amount of the fluororesin and the binder, formed on the insulating coating.

* * * * *

UNITED STATES PATENT AND TRADEMARK OFFICE

CERTIFICATE OF CORRECTION

PATENT NO. : 6,465,097 B1 
DATED : October 15, 2002
INVENTOR(S) : Isao Ueoka et al.

It is certified that error appears in the above-identified patent and that said Letters Patent is hereby corrected as shown below:

<u>Column 11,</u>
Lines 7 and 23, change "fluorosesin" to -- fluororesin --.

Signed and Sealed this

Twenty-fifth Day of November, 2003

JAMES E. ROGAN
*Director of the United States Patent and Trademark Office*